United States Patent
Hartless et al.

(10) Patent No.: US 9,942,072 B1
(45) Date of Patent: Apr. 10, 2018

(54) COMMUNICATIONS DEVICE WITH ADAPTIVE DEMODULATOR FOR PSK AND FSK MODULATIONS AND RELATED METHODS

(71) Applicant: HARRIS CORPORATION, Melbourne, FL (US)

(72) Inventors: Mac Lamar Hartless, Forest, VA (US); Stephen Robert Wynn, Lynchburg, VA (US); George W. Kellam, III, Forest, VA (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

(21) Appl. No.: 15/417,450

(22) Filed: Jan. 27, 2017

(51) Int. Cl.
| | |
|---|---|
| *H03C 5/00* | (2006.01) |
| *H03D 5/00* | (2006.01) |
| *H03K 7/10* | (2006.01) |
| *H03K 9/10* | (2006.01) |
| *H04L 27/22* | (2006.01) |
| *H04L 27/14* | (2006.01) |

(52) U.S. Cl.
CPC .............. *H04L 27/22* (2013.01); *H04L 27/14* (2013.01)

(58) Field of Classification Search
CPC ........ H04L 27/22; H04L 27/14; G06K 7/0008
USPC ....... 375/269, 224, 329, 331, 334, 335, 271, 375/272; 340/10.4
See application file for complete search history.

(56) References Cited

U.S. PATENT DOCUMENTS

| | | |
|---|---|---|
| RE44,352 E | 7/2013 | Lee et al. |
| 8,718,737 B2 | 5/2014 | Diab et al. |
| 8,731,293 B2 | 5/2014 | Fam et al. |
| 8,769,601 B2 | 7/2014 | Cooper et al. |
| 9,001,724 B2 | 4/2015 | Nakano et al. |
| 9,143,087 B2 | 9/2015 | Kang et al. |
| 2003/0090367 A1* | 5/2003 | Carroll ................. G06K 7/0008 340/10.4 |

* cited by examiner

*Primary Examiner* — Phuong Phu
(74) *Attorney, Agent, or Firm* — Allen, Dyer, Doppelt + Gilchrist, P.A. Attorneys at Law

(57) ABSTRACT

A wireless communications device may include a wireless receiver, and an adaptive demodulator coupled to the wireless receiver. The adaptive demodulator is configured to apply first and second bandpass filters to amplitude information of a received signal at first and second frequency bands, respectively, and classify the received signal as one of a PSK modulation type, a second PSK modulation type, and a third FSK modulation type based upon whether a tone exists in the amplitude information of the received signal in one or more of the first and second frequency bands. The adaptive demodulator is configured to adjust a demodulating parameter based upon a classified modulation type of the received signal.

23 Claims, 9 Drawing Sheets

COMMUNICATIONS DEVICE WITH ADAPTIVE DEMODULATOR FOR PSK AND FSK MODULATIONS AND RELATED METHODS

TECHNICAL FIELD

The present invention relates to the field of wireless communications, and, more particularly, to demodulation of signals and related methods.

BACKGROUND

In a typical digital wireless communication system, the data to be transmitted, which at its most basic level comprises 1s and 0s, may be encoded into a modulation waveform. Depending on the data being transmitted, a transmitter device changes the transmitted signal based upon the modulation waveform.

A typical modulation waveform may include M-ary frequency-shift keying (M-FSK), which is a frequency modulation scheme transmitting digital information through discrete frequency changes of a carrier wave. A rudimentary example of the M-FSK modulation waveform is the binary FSK (BFSK or 2-FSK), which includes using a single pair of discrete frequencies to transmit digital data. Other modulation waveforms may include, for example, Gaussian minimum shift keying (GMSK), M-ary pulse amplitude modulation (M-PAM), M-ary phase shift keying (M-PSK), and M-ary quadrature amplitude modulation (M-QAM). As will be appreciated by those skilled in the art, the choice of the modulation waveform may depend on the performance demands of the system, for example, throughput and the type of data services being transmitted. For example, some modulation waveforms may be better suited for transmitting voice services rather than pure data services.

SUMMARY

Generally speaking, a wireless communications device may include a wireless receiver, and an adaptive demodulator coupled to the wireless receiver. The adaptive demodulator may be configured to apply first and second bandpass filters to amplitude information of a received signal at first and second frequency bands, respectively, and classify the received signal as one of a first phase-shift keying (PSK) modulation type, a second PSK modulation type, and a third frequency-shift keying (FSK) modulation type based upon whether a tone exists in the amplitude information of the received signal in at least one of the first and second frequency bands. The adaptive demodulator may be configured to adjust at least one demodulating parameter based upon a classified modulation type of the received signal.

The adaptive demodulator may be configured to classify the received signal as the first PSK modulation type when the tone exists at the first frequency band, classify the received signal as the second PSK modulation type when the tone exists at the second frequency band, and classify the received signal as the third FSK modulation type when the tone does not exist at both of the first frequency band and the second frequency band. The adaptive demodulator may be configured to determine whether the tone exists in the amplitude information of the received signal at the first and second frequency bands by comparing the amplitude information of the received signal at the first and second frequency bands to a threshold.

In some embodiments, the first and second PSK modulation types may comprise quadrature phase shift keying (QPSK) modulation types at different symbol rates, and the third FSK modulation type may comprise a compatible 4-level frequency (C4FM) modulation type. The at least one demodulating parameter may comprise a demodulation filter bandwidth, or a phase difference calculation over a symbol, for example. The adaptive demodulator may be configured to determine a plurality of phase difference values when the received signal is the third FSK modulation type, the plurality of phase difference values being integrated over a symbol interval. The adaptive demodulator may be configured to determine a single phase difference value at a symbol rate when the received signal is one of the first and second PSK modulation types. The adaptive demodulator may be configured to apply the first and second bandpass filters, and determine whether the tone exists in the amplitude information of the received signal at the first and second frequency bands using first and second parallel processing paths.

Another aspect is directed to a wireless communications device. The wireless communications device may include a housing, an antenna carried by the housing, a wireless receiver carried by the housing and coupled to the antenna, and an adaptive demodulator carried by the housing and coupled to the wireless receiver. The adaptive demodulator may be configured to apply first and second bandpass filters to amplitude information of a received signal at first and second frequency bands, respectively, and classify the received signal as one of a first PSK modulation type, a second PSK modulation type, and a third FSK modulation type based upon whether a tone exists in the amplitude information of the received signal in at least one of the first and second frequency bands. The adaptive demodulator may be configured to adjust at least one demodulating parameter based upon a classified modulation type of the received signal.

Another aspect is directed to a wireless communication system. The wireless communication system may include a transmitter device configured to transmit a signal of unknown modulation type selected from one of a first PSK modulation type, a second PSK modulation type, and a third FSK modulation type. The wireless communication system may comprise a receiver device comprising a wireless receiver, and an adaptive demodulator coupled to the wireless receiver and configured to apply first and second bandpass filters to amplitude information of the signal at first and second frequency bands, respectively, and classify the signal as one of a first PSK modulation type, a second PSK modulation type, and a third FSK modulation type based upon whether a tone exists in the amplitude information of the signal in at least one of the first and second frequency bands. The adaptive demodulator may be configured to adjust at least one demodulating parameter based upon a classified modulation type of the signal.

Yet another aspect is directed to a method for wireless communications. The method may include operating an adaptive demodulator to apply first and second bandpass filters to amplitude information of a received signal at first and second frequency bands, respectively, and operating the adaptive demodulator to classify the received signal as one of a first PSK modulation type, a second PSK modulation type, and a third FSK modulation type based upon whether a tone exists in the amplitude information of the received signal in at least one of the first and second frequency bands. The method may include operating the adaptive demodulator to adjust at least one demodulating parameter based upon a classified modulation type of the received signal.

DETAILED DESCRIPTION

Figure 1:
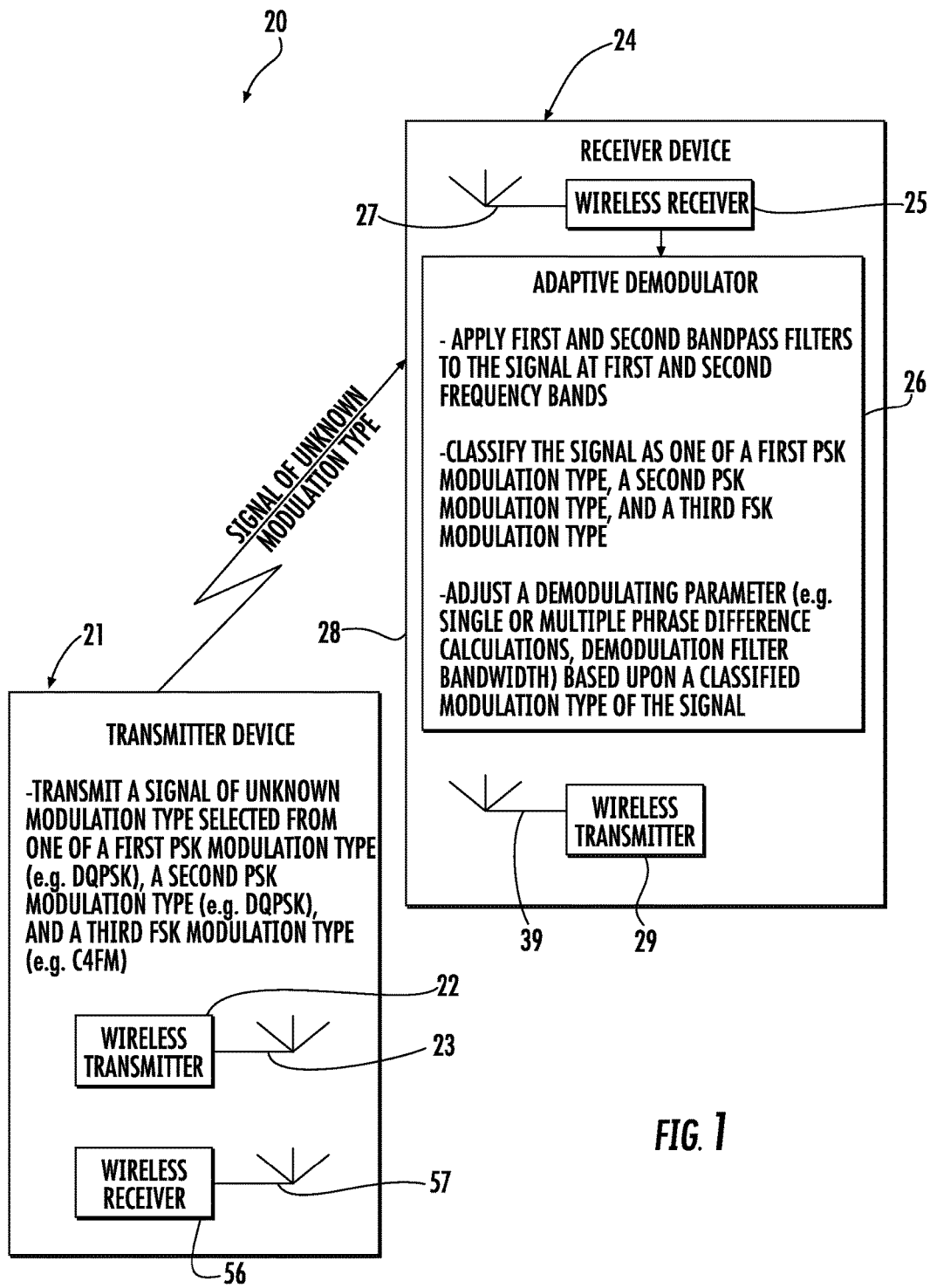
FIG. 1 is a schematic diagram of a wireless communication system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Referring now to FIGS. 1-6, a wireless communication system 20 according to the present disclosure is now described. The wireless communication system 20 includes a transmitter device 21 comprising a wireless transmitter 22, and an antenna 23 coupled thereto and configured to transmit a signal of unknown modulation type selected from one of a first PSK modulation type, a second PSK modulation type, and a third FSK modulation type. The transmitter device 21 illustratively includes a wireless receiver 56, and an antenna 57 coupled thereto for receiving signals.

For example, the wireless communication system 20 may deploy the Project 25 (P25 or Association of Public-Safety Communications Officials-International (APCO)-25) digital radio communication standard. In some embodiments, the first and second PSK modulation types may comprise differential quadrature phase shift keying (DQPSK) modulation types at different symbol rates (e.g. π/4 DQPSK/WCQPSK at 9.6 kbps and π/4 DQPSK/HDQPSK at 12 kbps), and the third FSK modulation type may comprise a compatible 4-level frequency (C4FM) modulation type at 9.6 kbps. In some embodiments, the received signal is carried within the control channel of the operational spectrum of the wireless communication system 20. Of course, other modulation types could be used in other embodiments.

Referring briefly to FIGS. 8A-10B, diagrams 80, 82 show the frequency spectrum 81 and the constellation diagram 83, respectively for the C4FM modulation type at 9.6 kbps. Diagrams 84, 86 show the frequency spectrum 85 and the constellation diagram 87, respectively for the WCQPSK modulation type at 9.6 kbps. Diagrams 88, 90 show the frequency spectrum 89 and the constellation diagram 91, respectively for the HDQPSK modulation type at 12 kbps.

The wireless communication system 20 includes a receiver device 24 comprising a wireless receiver 25, an adaptive demodulator 26 coupled to the wireless receiver, and an antenna 27 coupled to the wireless receiver. The receiver device 24 illustratively includes a wireless transmitter 29, and an antenna 39 coupled thereto for transmitting signals. The receiver device 24 illustratively includes a housing 28 carrying the antennas 27, 39, the wireless receiver 25, the adaptive demodulator 26, the wireless transmitter 29, and any other necessary circuitry. In some embodiments, the housing 28 may comprise a ruggedized portable housing (e.g. rubber or plastic material), but in other embodiments, the housing may be more suited for a fixed placement (e.g. rigid metallic box).

Although the wireless transmitters 22, 29 and the wireless receivers 56, 25 are depicted as separate blocks for illustrative purposes, it should be appreciated that these components may be part of integrated transceiver circuits. Similarly, separate antennas 23, 57, 27, 39 are shown for illustrative purposes, the skilled person will appreciate that a common transmit-receive antenna could be used. Also, the adaptive demodulator 26 may comprise a general purpose processing device in some embodiments, or an application-specific integrated circuit (ASIC) in other embodiments.

In the wireless communication system 20, the receiver device 24 may demodulate the received signal without a priori knowledge of the modulation type (i.e. the modulation waveform). In typical approaches, the receiver device 24 may use a single demodulation process (e.g. generic linear demodulation process) for the received signal regardless of the modulation type. In these approaches, the demodulation is usually suboptimal since the demodulation is generically derived to be functional for more than one modulation type. Indeed, in applications where the received signal may use modulation types of varying symbol rates, the generic demodulation may not be possible.

For example, diagram 30 shows the bit error rate (BER) plots 31, 32 for C4FM and WCQPSK, respectively, as a bandwidth for the demodulation filter (i.e. the In-phase/Quadrature filter) is varied. As shown, the modulation types have different optimal bandwidths. Moreover, diagrams 33, 36 shown the BER plots for the C4FM modulation type with linear processing 34, 37 and optimized C4FM demodulation processing 35, 38. As shown, when the generic linear processing is used, the BER is approximately 1.5 dB greater.

As shown in FIGS. 4-6 and 11A-11C, the adaptive demodulator 26 is configured to apply first and second bandpass filters to amplitude information (i.e. absolute value of the signal) of the signal at first and second frequency bands, respectively, and classify the signal (i.e. a received signal) as one of a first PSK modulation type, a second PSK modulation type, and a third FSK modulation type based upon whether a tone exists in the amplitude information of the signal in at least one of the first and second frequency bands, i.e. either one of the first and second frequency bands (Diagram 55, and Blocks 50-54).

More specifically, the adaptive demodulator 26 illustratively includes an initial absolute value block 41 ingesting the amplitude information of the received signal and splitting the received signal between first and second parallel processing paths. The first processing path illustratively includes the first bandpass filter 42 (e.g. the illustrated 100 Hz tone filter centered at 4.8 kHz), a first absolute value block 43 downstream from the first bandpass filter, a first low pass filter 44 downstream from the first bandpass filter, and a first threshold comparison block 45 downstream from the first low pass filter. The second processing path illustratively includes the second bandpass filter 46 (e.g. the illustrated 100 Hz tone filter centered at 6 kHz), a second absolute value block 47 downstream from the second bandpass filter, a second low pass filter 48 downstream from the second bandpass filter, and a second threshold comparison block 49 downstream from the second low pass filter. Moreover, each of the first and second processing paths has a specified bandwidth configured respectively for the first and second PSK modulation types.

The adaptive demodulator 26 is configured to classify the received signal as the first PSK modulation type (i.e. π/4 DQPSK/WCQPSK at 9.6 kbps) when the tone exists at the amplitude information of the first frequency band (4.8 kHz±50 Hz). The adaptive demodulator 26 is configured to classify the received signal as the second PSK modulation type (i.e. π/4 DQPSK/HDQPSK at 12 kbps) when the tone exists at the amplitude information of the second frequency band (6 kHz±50 Hz), and classify the received signal as the third FSK modulation type (i.e. C4FM) when the tone does not exist at both of (either of) the amplitude information of the first frequency band and the second frequency band. The adaptive demodulator 26 is configured to determine whether the tone exists in the amplitude information of the received signal at the first and second frequency bands by comparing the amplitude information of the received signal at the first and second frequency bands to a threshold via the first and second comparison blocks 45, 49. As shown in diagrams 95, 97, 100, the third FSK modulation type has a frequency spectrum 96 without tones. On the other hand, the frequency spectrums 98, 101 of the first and second PSK modulation types have detectable tones 99, 102.

In diagram 60, the threshold comparison processing is illustrated. In particular, the threshold 66 is at amplitude value 0.1. Curves 61, 62 depict the WCQPSK4p8 and HDQPSK6 modulation types, which exceed the threshold 66. Curves 63, 64, 65 depict the WCQPSK6, C4FM4p8, and HDQPSK4p8 modulation types, which do not exceed the threshold 66.

In contrast to the typical approaches, the adaptive demodulator 26 is configured to adjust at least one demodulating parameter based upon a classified modulation type of the received signal. In other words, the adaptive demodulator 26 optimizes the demodulation processing based upon the detected modulation type.

Figure 2:
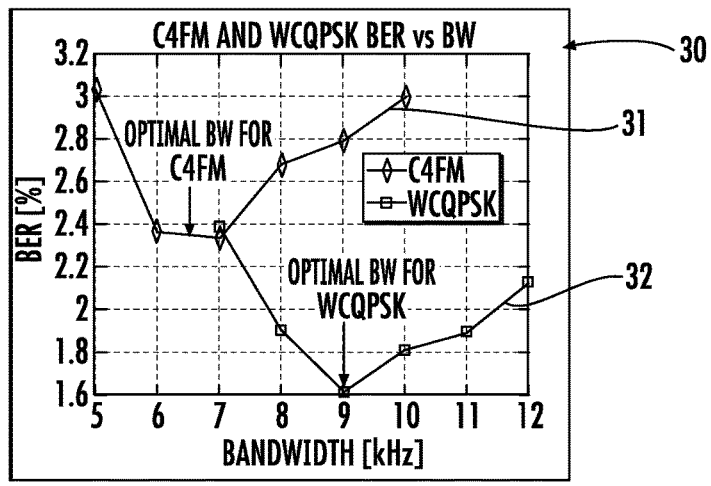
FIG. 2 is a diagram of bit error rate with varying bandwidth with C4FM and wide eye pattern-compatible quadrature phase shift keying (WCQPSK) modulation waveforms.
Figure 3A:
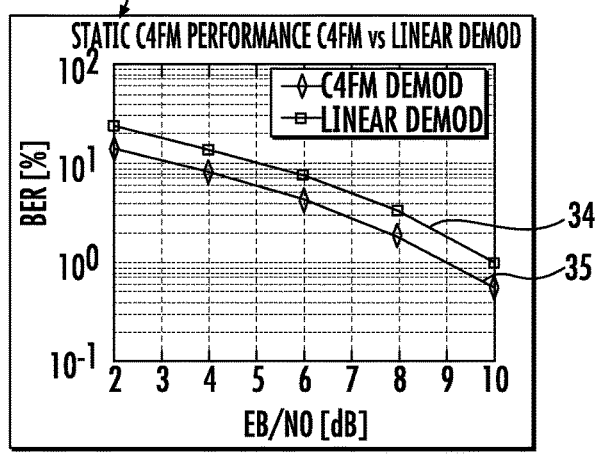
FIGS. 3A and 3B are diagrams of bit error rate difference for static and faded signals at 30 Hz Doppler frequency, respectively, for the C4FM modulation waveform.
Figure 3B:
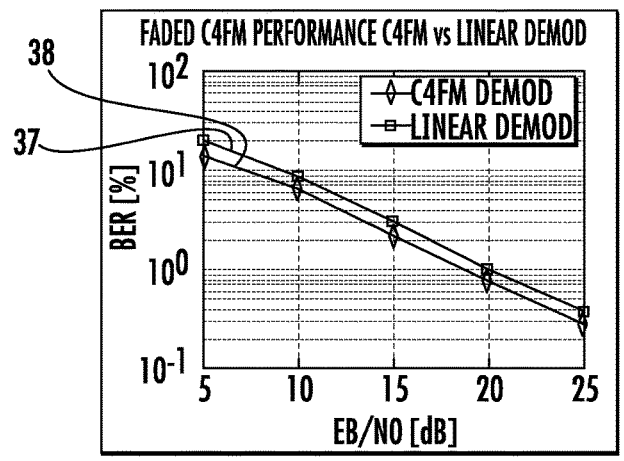
Figure 4:
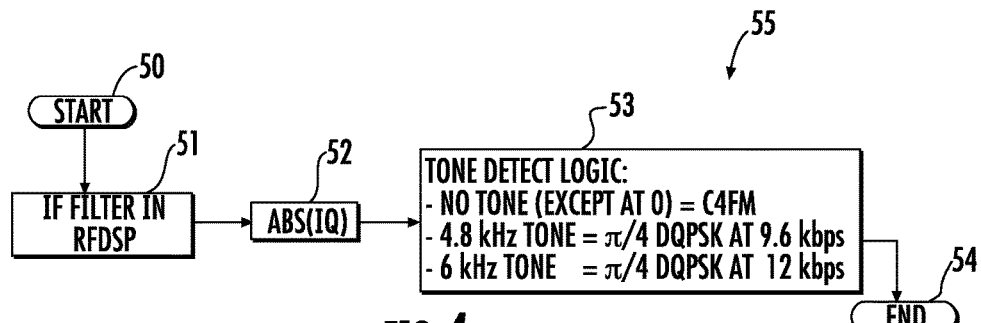
FIG. 4 is a flowchart illustrating operation of the adaptive demodulator of the wireless communication system of FIG. 1.
Figure 5:
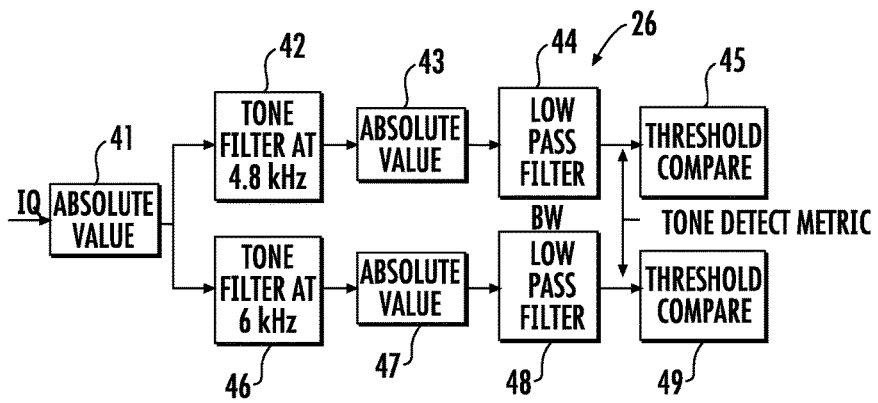
FIG. 5 is a schematic diagram of the adaptive demodulator of the wireless communication system of FIG. 1.
Figure 6:
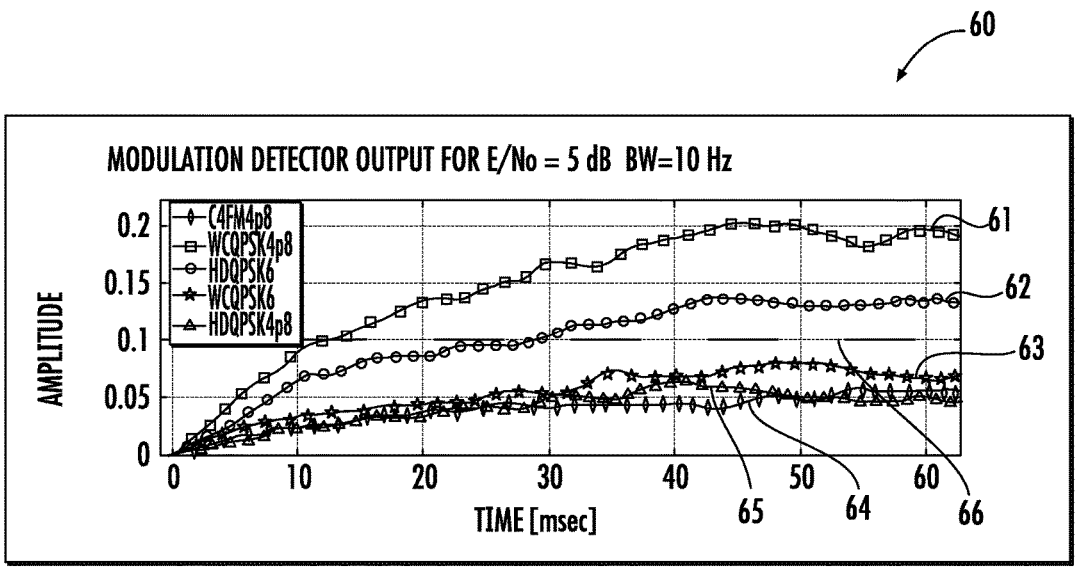
FIG. 6 is a diagram of modulation detector output in the wireless communication system of FIG. 1.

In some embodiments, at least one demodulating parameter may comprise a demodulation filter bandwidth. For example, when the demodulation filter bandwidth may be optimized based upon the data in diagram 30 (FIG. 2).

Figure 7A:
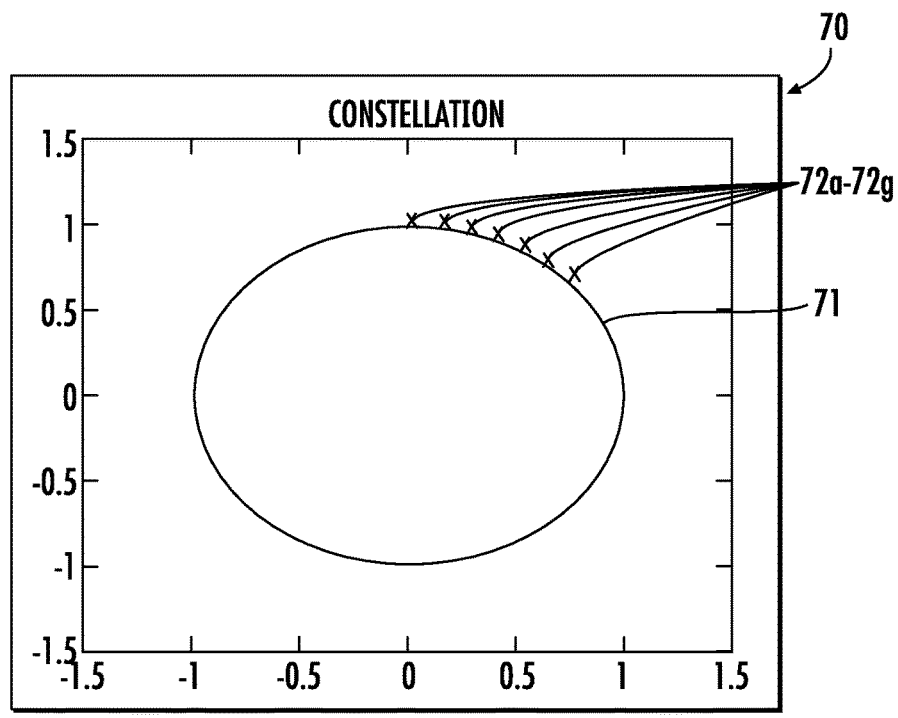
FIGS. 7A-7B are constellation diagrams for 9.6 kbps C4FM and 9.6 kbps WCQPSK, respectively, in the wireless communication system of FIG. 1.
Figure 7B:
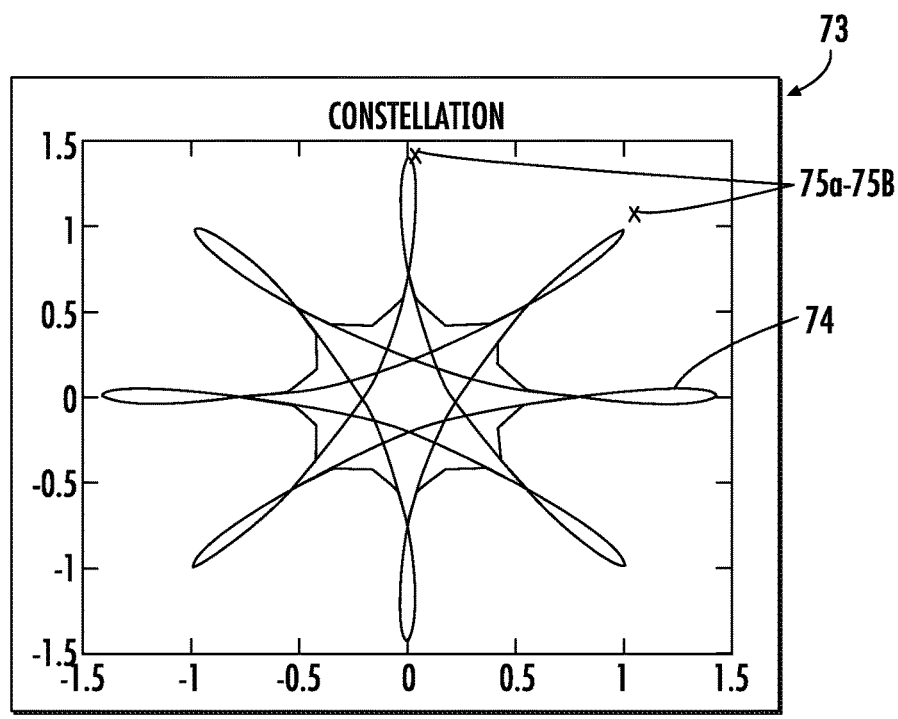
Figure 8A:
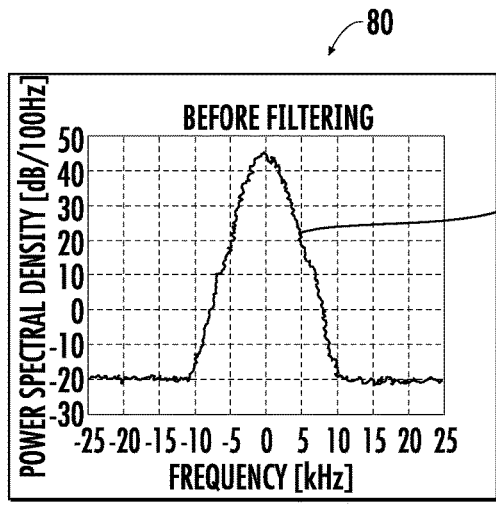
FIGS. 8A-8B are a spectrum diagram and a constellation diagram, respectively for 9.6 kbps C4FM, in the wireless communication system of FIG. 1.
Figure 8B:
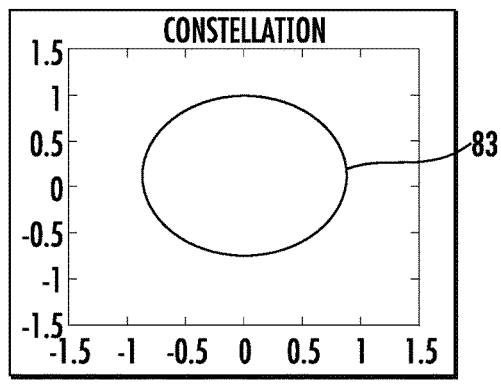
Figure 9A:
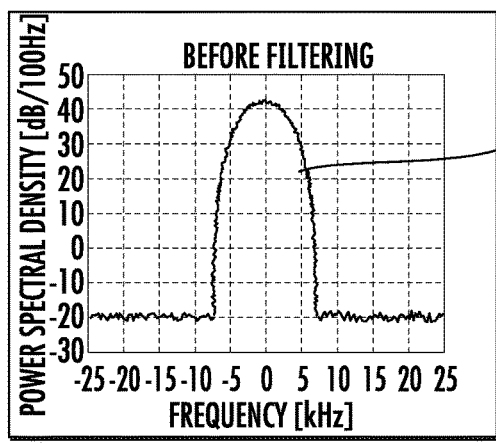
FIGS. 9A-9B are a spectrum diagram and a constellation diagram, respectively for 9.6 kbps WCQPSK, in the wireless communication system of FIG. 1.
Figure 9B:
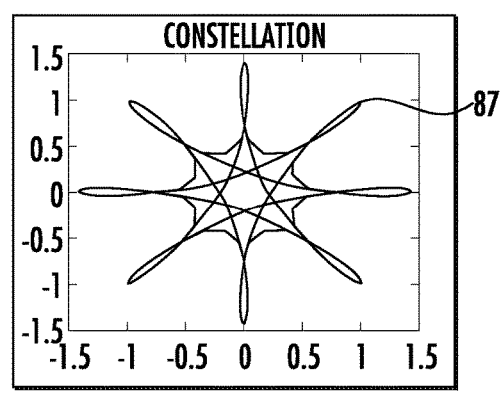
Figure 10A:
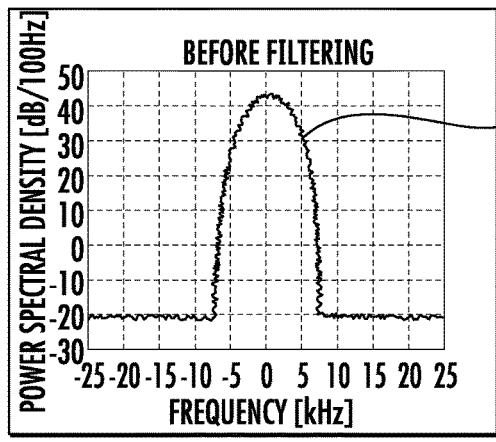
FIGS. 10A-10B are a spectrum diagram and a constellation diagram, respectively for 12 kbps Harmonized Differential Quadrature Phase Shift Keying (HDQPSK).
Figure 10B:
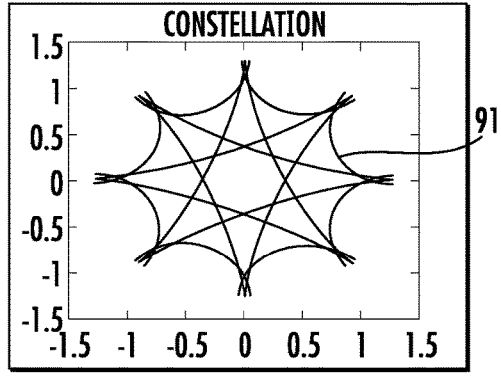
Figure 11A:
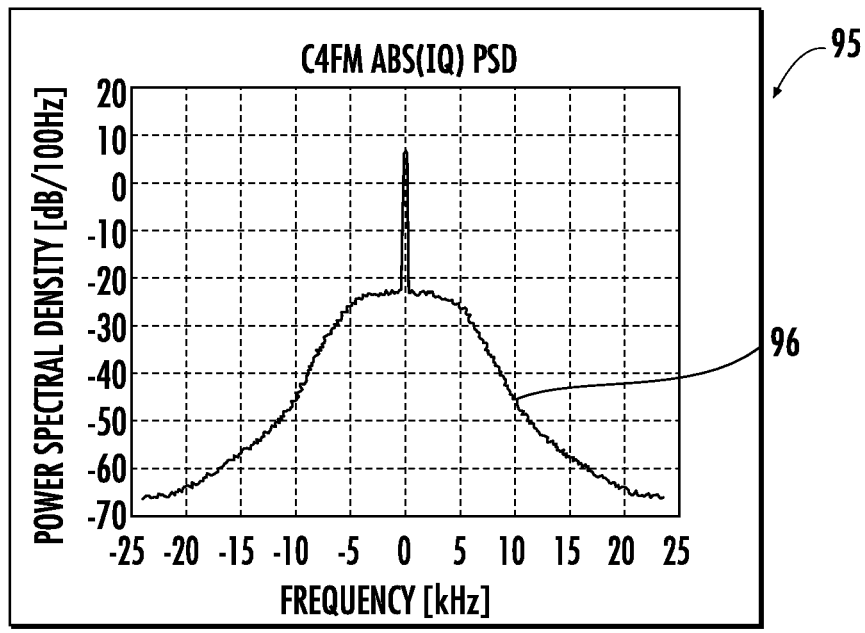
FIGS. 11A-11C are spectrum diagrams for the C4FM, WCQPSK, and HDQPSK modulation waveforms, respectively, in the wireless communication system of FIG. 1.
Figure 11B:
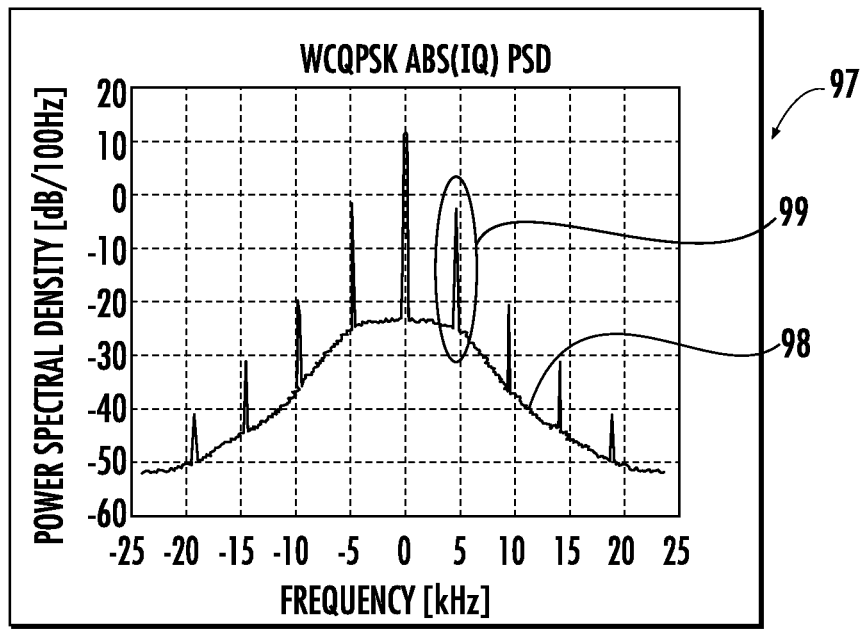
Figure 11C:
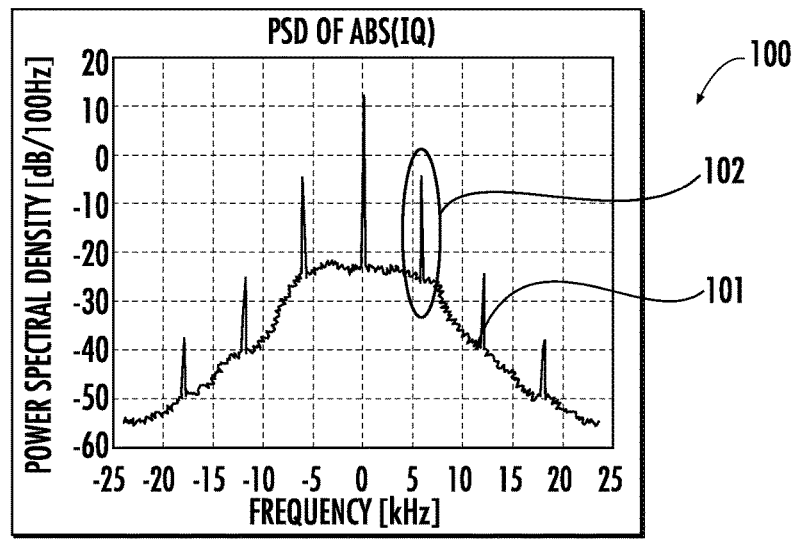

Referring now to FIGS. 7A-7B, in some embodiments, the at least one demodulating parameter may comprise a phase difference calculation over a symbol. In diagram 70, which shows the constellation diagram 71 of C4FM at 9.6 kbps, the adaptive demodulator 26 is configured to determine a plurality of phase difference values 72a-72g when the received signal is the third FSK modulation type, the plurality of phase difference values being integrated over a symbol interval. This may help to prevent $2n$ phase wraps in weak signal (e.g. signal has fade or noise) environments. In diagram 73, which shows the constellation diagram 74 of WCQPSK at 9.6 kbps, the adaptive demodulator 26 is configured to determine a single phase difference value 75a-75b at a symbol rate when the received signal is one of the first and second PSK modulation types (i.e. the linear modulations). Here, the adaptive demodulator 26 is configured to sample at peak energy points of the received signal.

Another aspect is directed to a wireless communications device (i.e. the aforementioned receiver device) 24. The wireless communications device 24 includes a housing 28, an antenna 27 carried by the housing, a wireless receiver 25 carried by the housing and coupled to the antenna, and an adaptive demodulator 26 carried by the housing and coupled to the wireless receiver. The adaptive demodulator 26 is configured to apply first and second bandpass filters to amplitude information of a received signal at first and second frequency bands, respectively, and classify the received signal as one of a first PSK modulation type, a second PSK modulation type, and a third FSK modulation type based upon whether a tone exists in the amplitude information of the received signal in at least one of (i.e. either one of the first and second frequency bands) the first and second frequency bands. The adaptive demodulator 26 is configured to adjust at least one demodulating parameter based upon a classified modulation type of the received signal.

Yet another aspect is directed to a method for wireless communications. The method includes operating an adaptive demodulator 26 to apply first and second bandpass filters to amplitude information of a received signal at first and second frequency bands, respectively, and operating the adaptive demodulator to classify the received signal as one of a first PSK modulation type, a second PSK modulation type, and a third FSK modulation type based upon whether a tone exists in the amplitude information of the received signal in at least one of the first and second frequency bands (i.e. either one of the first and second frequency bands). The method includes operating the adaptive demodulator 26 to adjust at least one demodulating parameter based upon a classified modulation type of the received signal.

Figure 12A:
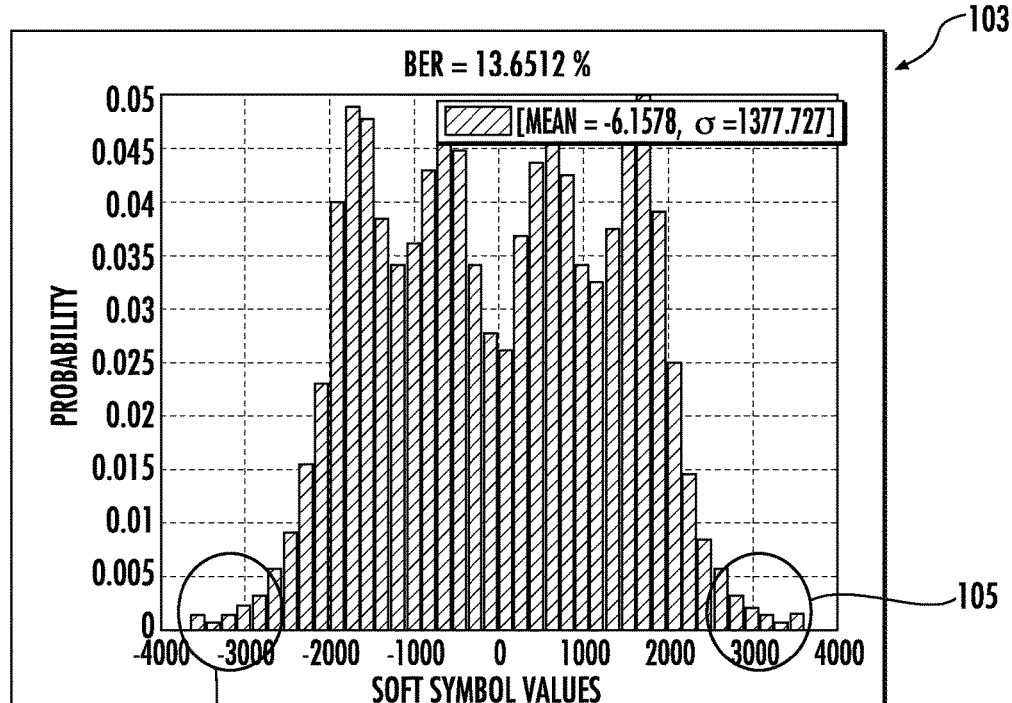
FIGS. 12A-12B are soft symbol decision diagrams with integration of multiple phase differences over a symbol period calculations and single phase difference calculations over a symbol period, respectively, with a faded weak signal in the wireless communication system of FIG. 1.
Figure 12B:
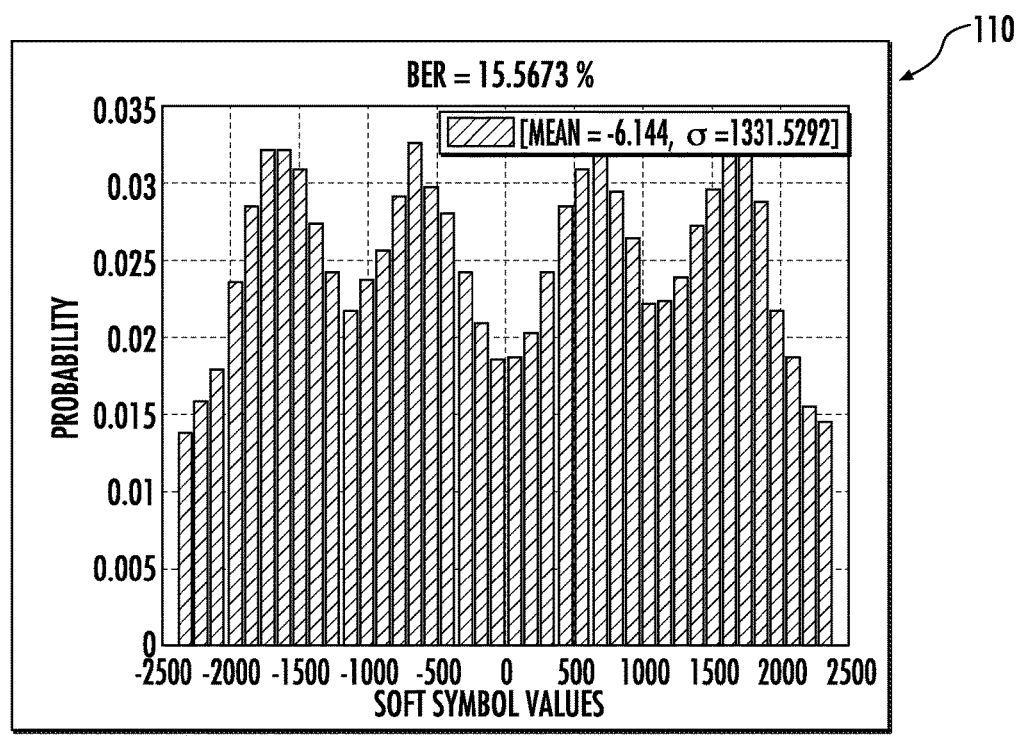

Referring now additionally to FIGS. 12A-12B, the soft symbol comparison performance (with faded weak received signal) of the wireless communication system 20 is described. In particular, diagram 103 shows the BER when the adaptive demodulator 26 is configured to integrate multiple phase differences over a symbol period. The diagram 103 illustratively includes portions 104-105 that show the received signal demodulated correctly when integrating multiple phase differences, i.e. a BER of approximately 13.7%. Diagram 110 shows the received signal demodulated when calculating a single phase difference over the symbol period integrating multiple phase differences, i.e. a BER of approximately 15.6%.

Figure 13A:
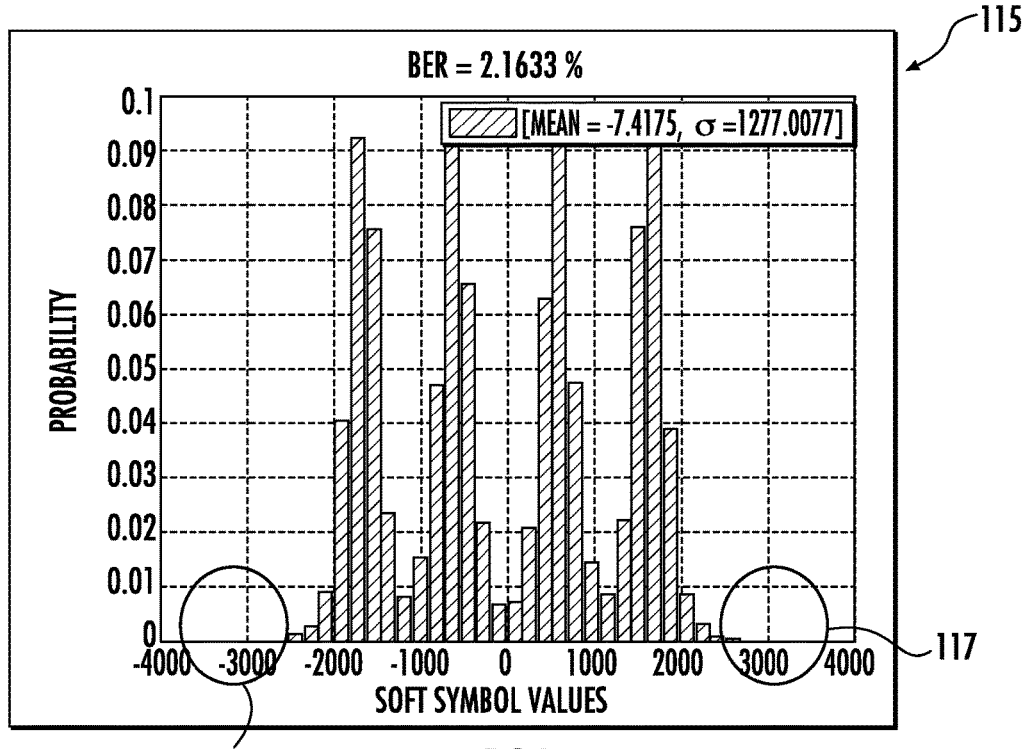
FIGS. 13A-13B are soft symbol decision diagrams with integration of multiple phase differences over a symbol period calculations and single phase difference calculations over a symbol period, respectively, with a signal at the coverage threshold in the wireless communication system of FIG. 1.
Figure 13B:
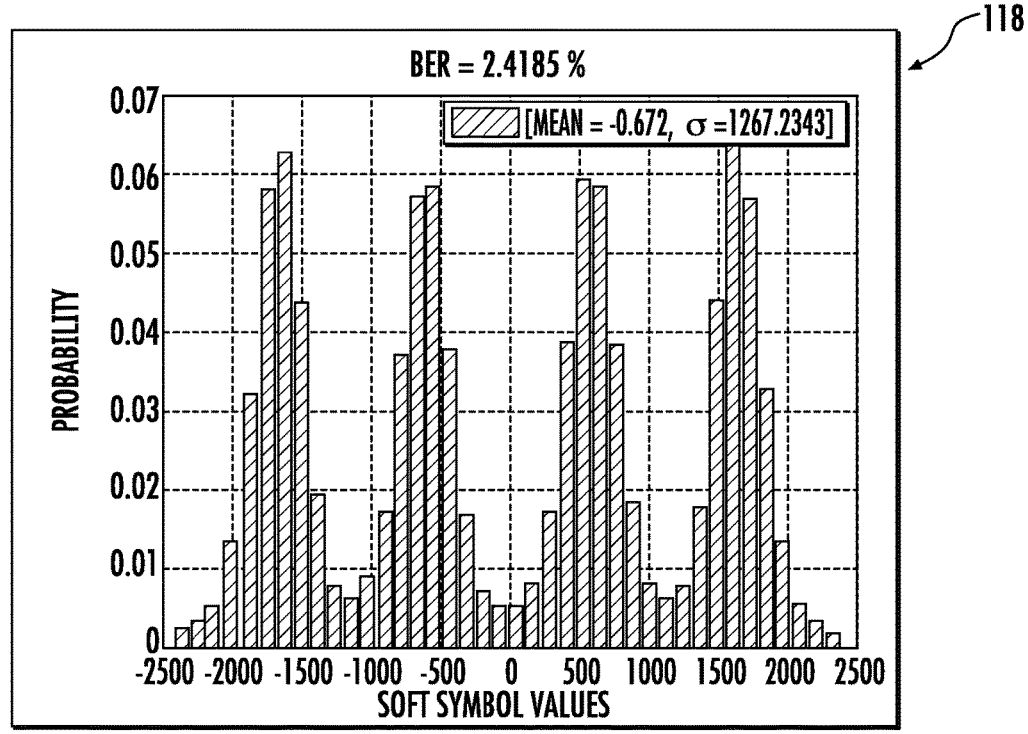

Referring now additionally to FIGS. 13A-13B, the soft symbol comparison performance (with coverage threshold received signal) of the wireless communication system 20 is described. In particular, diagram 115 shows the BER when the adaptive demodulator 26 is configured to integrate multiple phase differences over a symbol period. The diagram 115 illustratively includes portions 116-117 that show the received signal demodulated correctly when integrating multiple phase differences, i.e. a BER of approximately 2.16%. Diagram 118 shows the received signal demodulated when calculating a single phase difference over the symbol period integrating multiple phase differences, i.e. a BER of approximately 2.42%.

Advantageously, the wireless communication system 20 may provide for a simple tone detection method for determining modulation type and symbol rate. Also, the wireless communication system 20 may adapt filter bandwidth based on modulation type to improve radio receive sensitivity, and adapt the phase difference demodulator method using one difference over a symbol for π/4 DQPSK modulations or integrating several phase differences over a symbol for C4FM modulation to increase radio performance. Moreover, the wireless communication system 20 deploys an algorithm that may improve existing P25 Phase 1&2 terminal performance for allowing devices to operate in a P25 conventional simulcast system, and may enhance radio sensitivity, which will improve voice quality and enhance overall user experience.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:
1. A wireless communications device comprising:
a wireless receiver; and
an adaptive demodulator coupled to said wireless receiver and configured to
apply first and second bandpass filters to amplitude information of a received signal at first and second frequency bands, respectively,
classify the received signal as one of a first phase-shift keying (PSK) modulation type, a second PSK modulation type, and a third frequency-shift keying (FSK) modulation type based upon whether a tone exists in the amplitude information of the received signal in at least one of the first and second frequency bands, and
adjust at least one demodulating parameter based upon a classified modulation type of the received signal.
2. The wireless communications device of claim 1 wherein said adaptive demodulator is configured to:
classify the received signal as the first PSK modulation type when the tone exists at the first frequency band;
classify the received signal as the second PSK modulation type when the tone exists at the second frequency band; and
classify the received signal as the third FSK modulation type when the tone does not exist at both of the first frequency band and the second frequency band.
3. The wireless communications device of claim 1 wherein said adaptive demodulator is configured to determine whether the tone exists in the amplitude information of the received signal at the first and second frequency bands by comparing the amplitude information of the received signal at the first and second frequency bands to a threshold.
4. The wireless communications device of claim 1 wherein the first and second PSK modulation types comprise quadrature phase shift keying (QPSK) modulation types at different symbol rates; and wherein the third FSK modulation type comprises a compatible 4-level frequency (C4FM) modulation type.
5. The wireless communications device of claim 1 wherein the at least one demodulating parameter comprises a demodulation filter bandwidth.
6. The wireless communications device of claim 1 wherein the at least one demodulating parameter comprises a phase difference calculation over a symbol.
7. The wireless communications device of claim 6 wherein said adaptive demodulator is configured to determine a plurality of phase difference values when the received signal is the third FSK modulation type, the plurality of phase difference values being integrated over a symbol interval.
8. The wireless communications device of claim 6 wherein said adaptive demodulator is configured to determine a single phase difference value at a symbol rate when the received signal is one of the first and second PSK modulation types.
9. The wireless communications device of claim 1 wherein said adaptive demodulator is configured to apply the first and second bandpass filters, and determine whether the tone exists in the amplitude information of the received signal at the first and second frequency bands using first and second parallel processing paths.
10. A wireless communications device comprising:
a housing;
an antenna carried by said housing;
a wireless receiver carried by said housing and coupled to said antenna; and
an adaptive demodulator carried by said housing and coupled to said wireless receiver and configured to
apply first and second bandpass filters to amplitude information of a received signal at first and second frequency bands, respectively,
classify the received signal as one of a first phase-shift keying (PSK) modulation type, a second PSK modulation type, and a third frequency-shift keying (FSK) modulation type based upon whether a tone exists in the amplitude information of the received signal in at least one of the first and second frequency bands, and
adjust at least one demodulating parameter based upon a classified modulation type of the received signal.
11. The wireless communications device of claim 10 wherein said adaptive demodulator is configured to:
classify the received signal as the first PSK modulation type when the tone exists at the first frequency band;
classify the received signal as the second PSK modulation type when the tone exists at the second frequency band; and
classify the received signal as the third FSK modulation type when the tone does not exist at both of the first frequency band and the second frequency band.
12. The wireless communications device of claim 10 wherein said adaptive demodulator is configured to determine whether the tone exists in the amplitude information of the received signal at the first and second frequency bands by comparing the amplitude information of the received signal at the first and second frequency bands to a threshold.
13. The wireless communications device of claim 10 wherein the first and second PSK modulation types comprise quadrature phase shift keying (QPSK) modulation types at different symbol rates; and wherein the third FSK modulation type comprises a compatible 4-level frequency (C4FM) modulation type.

14. A wireless communication system comprising:
a transmitter device configured to transmit a signal of unknown modulation type selected from one of a first phase-shift keying (PSK) modulation type, a second PSK modulation type, and a third frequency-shift keying (FSK) modulation type; and
a receiver device comprising a wireless receiver, and
an adaptive demodulator coupled to said wireless receiver and configured to
apply first and second bandpass filters to amplitude information of the signal at first and second frequency bands, respectively,
classify the signal as one of a first phase-shift keying (PSK) modulation type, a second PSK modulation type, and a third frequency-shift keying (FSK) modulation type based upon whether a tone exists in the amplitude information of the signal in at least one of the first and second frequency bands, and
adjust at least one demodulating parameter based upon a classified modulation type of the signal.

15. The wireless communication system of claim 14 wherein said adaptive demodulator is configured to:
classify the received signal as the first PSK modulation type when the tone exists at the first frequency band;
classify the received signal as the second PSK modulation type when the tone exists at the second frequency band; and
classify the received signal as the third FSK modulation type when the tone does not exist at both of the first frequency band and the second frequency band.

16. The wireless communication system of claim 14 wherein said adaptive demodulator is configured to determine whether the tone exists in the amplitude information of the received signal at the first and second frequency bands by comparing the amplitude information of the received signal at the first and second frequency bands to a threshold.

17. The wireless communication system of claim 14 wherein the first and second PSK modulation types comprise quadrature phase shift keying (QPSK) modulation types at different symbol rates; and wherein the third FSK modulation type comprises a compatible 4-level frequency (C4FM) modulation type.

18. A method for wireless communications comprising:
operating an adaptive demodulator to apply first and second bandpass filters to amplitude information of a received signal at first and second frequency bands, respectively;
operating the adaptive demodulator to classify the received signal as one of a first phase-shift keying (PSK) modulation type, a second PSK modulation type, and a third frequency-shift keying (FSK) modulation type based upon whether a tone exists in the amplitude information of the received signal in at least one of the first and second frequency bands; and
operating the adaptive demodulator to adjust at least one demodulating parameter based upon a classified modulation type of the received signal.

19. The method of claim 18 further comprising:
operating the adaptive demodulator to classify the received signal as the first PSK modulation type when the tone exists at the first frequency band;
operating the adaptive demodulator to classify the received signal as the second PSK modulation type when the tone exists at the second frequency band; and
operating the adaptive demodulator to classify the received signal as the third FSK modulation type when the tone does not exist at both of the first frequency band and the second frequency band.

20. The method of claim 18 further comprising operating the adaptive demodulator to determine whether the tone exists in the amplitude information of the received signal at the first and second frequency bands by comparing the amplitude information of the received signal at the first and second frequency bands to a threshold.

21. The method of claim 18 wherein the first and second PSK modulation types comprise quadrature phase shift keying (QPSK) modulation types at different symbol rates; and wherein the third FSK modulation type comprises a compatible 4-level frequency (C4FM) modulation type.

22. The method of claim 18 wherein the at least one demodulating parameter comprises a demodulation filter bandwidth.

23. The method of claim 18 wherein the at least one demodulating parameter comprises a phase difference calculation.

* * * * *